Oct. 2, 1923.
H. L. BLOOD
1,469,354
LATHE CONTROLLING MECHANISM
Filed Oct. 6, 1919   2 Sheets-Sheet 1
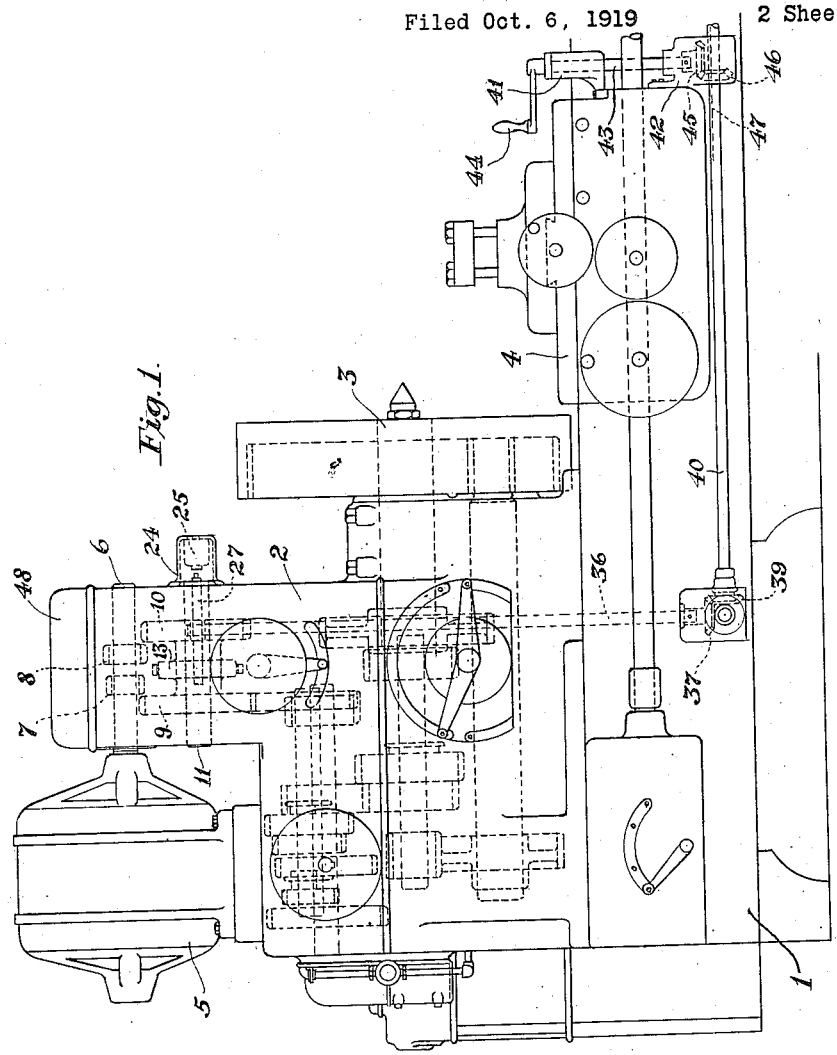
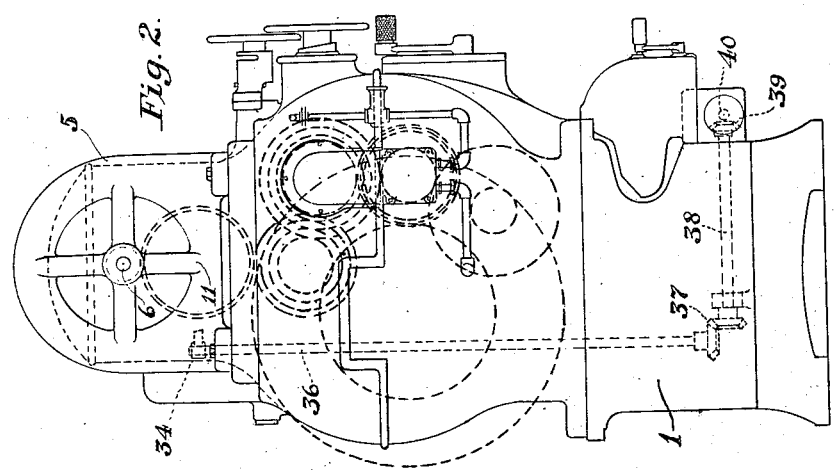
Inventor
H. L. Blood
By S. Jay Teller
Attorney

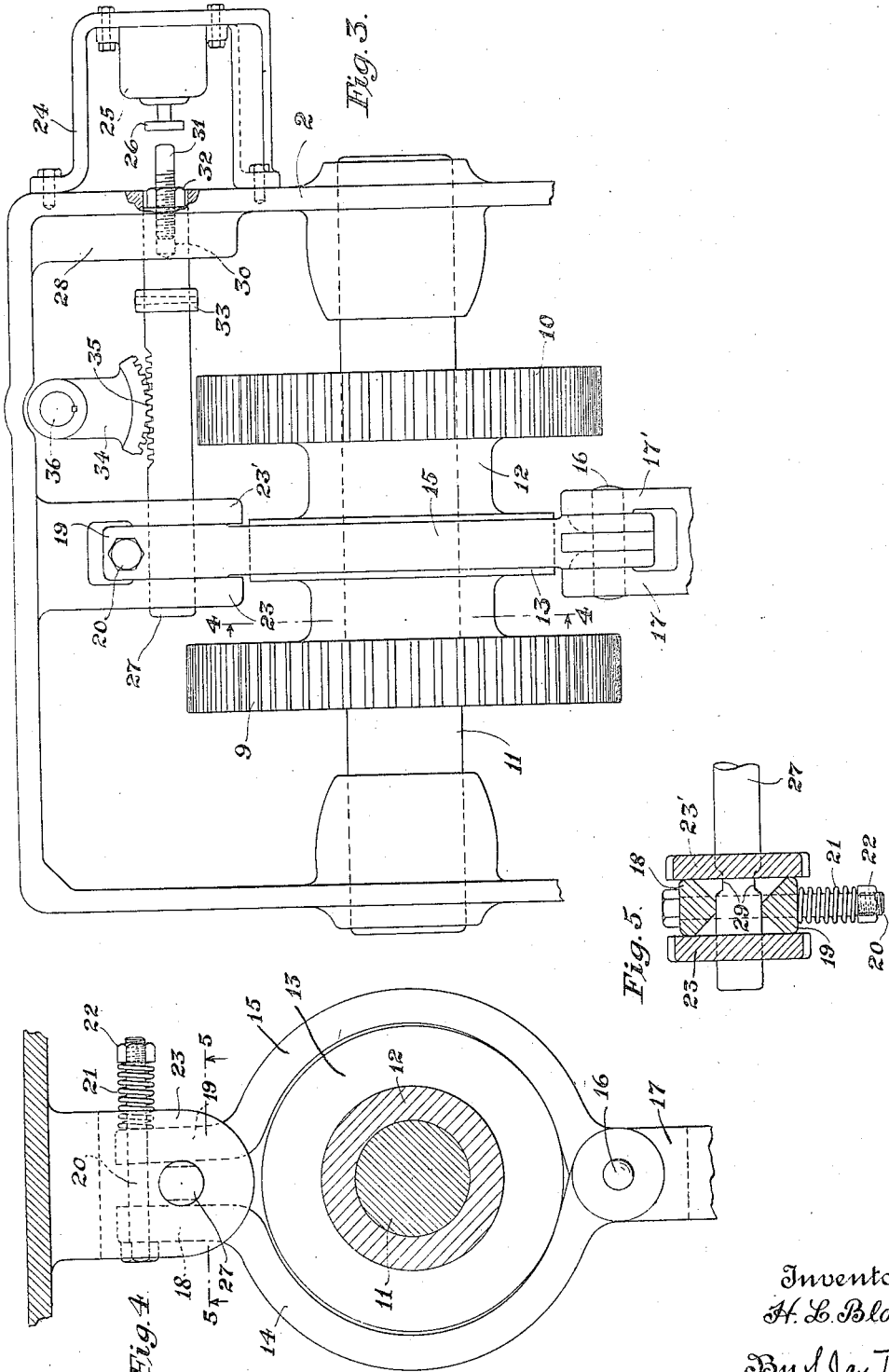

Patented Oct. 2, 1923.

1,469,354

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

LATHE-CONTROLLING MECHANISM.

Application filed October 6, 1919. Serial No. 328,762.

*To all whom it may concern:*

Be it known that I, HAROLD L. BLOOD, a citizen of the United States, and a resident of Plainfield, in the county of Union and State of New Jersey, have invented certain new and useful Improvements in Lathe-Controlling Mechanisms, of which the following is a specification.

This invention relates to a lathe and particularly to a mechanism for controlling the rotation of the lathe spindle and the movement of the carriage, and to means always at the hand of the operator for controlling such mechanism.

It is an object of the invention to provide an improved mechanism of the above character and it is a particular object to secure easy and direct control thereof by mounting a controlling means on the movable carriage always within easy reach of the operator.

It is a further and more specific object of the invention to provide a mechanical brake as a part of the improved mechanism for controlling the operation of the spindle and means on the movable carriage for controlling the operation of the brake.

In machines driven by a direct current motor, the motor itself serves as a brake when the power is cut off and the armature thereof short circuited in the usual manner. However, an alternating current motor cannot be used as a brake in this manner and in lathes and like machines using such a drive it is necessary to provide other means of braking. It is therefore a particular object of the present invention to provide a control mechanism particularly adapted for use in a lathe or like machine having an alternating current motor drive, such mechanism being adapted to control both the power entering the machine and a brake thereon.

Machines of the above character require that the power and operation of the machine shall at all times be under the direct and easy control of the operator; accordingly, I herein disclose a controlling device operated by a single handle placed within easy reach of the operator and adapted by the same movement to operate both the power control means, shown herein as a push button control in an electric control box, and the machine brake. As will hereinafter be more fully described, full movement of the controlling device in one direction releases the brake and applies the current to start the machine and full movement in the opposite direction thereof cuts off the current and applies the brake to stop the machine.

The drawing illustrates and the specification describes herein one embodiment of the invention, however, it should be clearly understood that the invention in its broad aspect is capable of other embodiments and may be used in machines other than lathes. Reference to the claims should be made to determine the scope of the invention.

Referring to the drawing:

Figure 1 is a front view of the major portion of a lathe having the present invention embodied therein.

Fig. 2 is an end view thereof looking at the left end of Fig. 1.

Fig. 3 is an enlarged detail plan view of the principal elements of the control mechanism within the headstock of the lathe, the view being taken with the cover plate 48 and the motor shaft and its gears removed.

Fig. 4 is a cross section taken on the line 4—4 of Fig. 3 looking in the direction of the arrows and showing the brake mechanism and its operating parts.

Fig. 5 is a cross section taken on the line 5—5 of Fig. 4 looking in the direction of the arrows and showing the relation of the brake arms to the brake rod.

Referring more specifically to the drawing, wherein a lathe embodying the present invention is shown, 1 represents the lathe bed, 2 the headstock thereof, 3 the lathe spindle, 4 the movable tool carriage and 5 the electric drive motor. The motor drive shaft 6 has two gears 7 and 8 slidably splined thereon and adapted to mesh with the gears 9 and 10 respectively on the countershaft 11. The lathe spindle 3 is operated by a system of gearing including speed change gearing, as shown in Fig. 1, between the countershaft 11 and the lathe spindle 3. The carriage 4 is operated from the motor and the usual system of gearing, including a portion of the gearing just described, extending into the speed change gear box at the left of Fig. 1 and thence to the carriage. Since this gearing specifically is not a part of the present invention, further description thereof will be omitted.

The control mechanism comprising the present invention will now be described. The brake forming a part of this mechanism may be any form of mechanical brake, but preferably I provide a friction brake as shown in the drawing. To secure a solid structure for the brake mechanism, I prefer to form the gears 9 and 10 in one piece with the hub 12 and the brake drum 13 therebetween and integral therewith. The brake-shoe element herein shown comprises two brake-shoe halves 14 and 15 pivoted at 16 between lugs 17—17' on the machine frame and having arms 18 and 19 at the opposite ends thereof. These arms are normally held together with the brake-shoe in contact with the drum 13 by means of a bolt 20 extending therethrough and having spring 21 mounted thereon between nut 22 and arm 19. The arms are mounted between lugs 23—23' on the machine frame and thereby held from any lateral movement.

As seen in Figs. 1 and 3, I provide a bracket 24 on the exterior of the machine frame and support therein an electric control box 25 for controlling the current delivered to the drive motor 5. As a simple means of clearly illustrating the invention, I show a push button 26 extending from the box and normally held in this extended position by a spring within the box, the electric control switch within the box thereby being normally held in an open position. The electric contacts within the box are so arranged that inward movement of the control button will operate to close the switch and start the motor.

As heretofore stated, the invention comprises means on the movable carriage for controlling the power control means and the brake, and it is obvious that such two elements could be controlled by separate means on the carriage or both be controlled by a single means. I prefer to control both by a single handle on the carriage, which structure will now be described. As a means for operating both the power control means, herein the button 26, and the friction brake 14—15, I provide an operating rod 27 mounted at its ends in lugs 23—23' and bracket 28. The brake engaging portion of this rod, as shown most clearly in Figs. 4 and 5, extends between the brake arms 18 and 19 and is notched at diametrically opposite points 29 to receive the brake arms therein. The opposite end of the rod is drilled and threaded as at 30 to adjustably receive an operating pin 31 therein, such pin being locked in its adjusted position by means of lock nut 32. By the adjustment of this pin the rod may be made to engage the controlling button 26 at the proper time relative to the release of the brake and vice versa. I also provide a collar 33 on the rod 27 to prevent excessive movement of the rod toward the control box 25.

In Figs. 1, 3, 4 and 5, the machine is shown in neutral position with the electric current cut off and the brake free from the brake drum 13. It will now be clear that movement of the operating rod 27 to the right will force the push button 26 inward and close the switch to start the motor, and movement of the operating rod to the left will allow the brake arms 18 and 19 to drop into the notches 29 in the operating rod, thereby applying the brake to stop the machine.

As heretofore stated, machines of this type require that the power and operation thereof shall at all times be under the direct and easy control of the operator. Various constructions might be devised whereby the operating rod 27 could be operated by means placed within the reach of the operator. However, I prefer to secure such control herein by a system of shafting whereby an operating handle is mounted directly on the tool carriage always in front of the operator.

Referring to Figs. 2 and 3, it will be seen that a sector 34 having toothed engagement 35 with the operating rod 27 is mounted on a vertical operating shaft 36 at the back of the lathe. This shaft extends downward within the lathe housing and through bevel gears 37 has operative engagement with a short transverse shaft 38 which in like manner through bevel gears 39 has operative engagement with a shaft 40 extending along the lower portion of the front of the lathe bed. Brackets 41 and 42 on the tool carriage support a short shaft 43 having an operating handle 44 at the top thereof. A bevel gear 45 mounted on the lower end of the shaft 43 engages a like gear 46 mounted in bracket 42 and slidably keyed to shaft 40, such shaft being splined at 47 for this purpose. By this construction and arrangement of the shafts, the operator always has the operating handle directly at hand and may thereby operate the rod 27 and fully control the power and operation of the lathe directly from the tool carriage.

What I claim is:

1. In a machine of the class described, the combination of a bed, a carriage movable thereon, a headstock, a driving shaft rotatably mounted in the headstock, power control means remote from the shaft, a brake cooperating with the shaft, means mounted in the headstock laterally of the shaft and cooperating with the power control means and the brake, and mechanism including a handle on the carriage and an operative connection therefrom to the second named means for controlling both the power and brake.

2. In a machine of the class described, the combination of a bed, a carriage movable thereon, a headstock, a driving shaft rotatably mounted in the headstock, power control means remote from the shaft, a brake cooperating with the shaft, an element mounted in the headstock laterally of the shaft and cooperating with the power control means and the brake, a handle on the carriage, and a system of shafting operatively connecting the handle with the element whereby the element may be moved in one direction to release the brake and apply the power or in the other direction to interrupt the power and apply the brake.

3. In a machine of the class described, the combination of a bed, a carriage movable thereon, a headstock, a driving shaft rotatably mounted in the headstock, power control means remote from the shaft, a brake cooperating with the shaft, a rod mounted for axial movement in the headstock laterally of the shaft and cooperating with the power control means and the brake respectively along different portions of its length, a handle on the carriage, and means including a splined shaft extending along the carriage for operatively connecting the handle to the rod, movement of the handle and rod in one direction being adapted to release the brake and apply the power and movement thereof in the other direction being adapted to interrupt the power and apply the brake.

4. In a machine of the class described, the combination of a bed, a carriage movable thereon, a headstock, a driving shaft rotatably mounted in the headstock, power control means remote from the shaft, a brake drum on the shaft, a pair of brake shoes surrounding the brake drum, a spring normally engaging the shoes with the drum, a rod mounted in the headstock laterally of the shaft and cooperating with the power controlled means and the brake shoes, and mechanism including a handle on the carriage and an operative connection therefrom to the rod for controlling both the power and brake, movement of the handle and rod in one direction being adapted to separate the brake shoes and apply the power and movement thereof in the other direction being adapted to interrupt the power and to permit the spring to engage the shoes with the drum.

5. In a machine of the class described, the combination of a bed, a carriage movable thereon, a headstock, a spindle rotatably mounted in the headstock, a mechanical brake cooperating with the spindle, a motor for driving the spindle, a switch for controlling the motor, controlling means cooperating with the brake and switch, and a handle on the carriage operatively connected to the controlling means, movement of the handle in one direction being adapted to release the brake and close the switch to rotate the spindle and movement thereof in the opposite direction being adapted to open the switch and apply the brake to stop the rotation of the spindle.

6. In a machine of the class described, the combination of a bed, a carriage movable thereon, a headstock, a spindle rotatably mounted in the headstock, a mechanical brake cooperating with the spindle, a motor for driving the spindle, a switch for controlling the motor, an element movable in opposite directions and cooperating with the brake at one portion of its length and with the switch at another portion thereof, and a handle on the carriage operatively connected to the element, movement of the handle and element in one direction being adapted to release the brake and close the switch to rotate the spindle and movement thereof in the opposite direction being adapted to open the switch and apply the brake to stop the rotation of the spindle.

7. In a machine of the class described, the combination of a bed, a carriage movable thereon, a headstock, a spindle rotatably mounted in the headstock, a mechanical brake cooperating with the spindle, a motor for driving the spindle, a switch for controlling the motor, a rod mounted for axial movement in the headstock, one portion of the rod cooperating with the brake, a pin adjustably mounted on the rod and cooperating with the switch, a handle on the carriage, and means including a splined shaft extending along the carriage for operatively connecting the handle to the rod, movement of the handle and rod in one direction being adapted to release the brake and close the switch to rotate the spindle and movement thereof in the opposite direction being adapted to open the switch and apply the brake to stop the rotation of the spindle.

8. In a machine of the class described, the combination of a bed, a carriage movable thereon, a headstock, a spindle rotatably mounted in the headstock, a power control means and a brake cooperating with the spindle, means mounted in the headstock and cooperating with the power control means and the brake, a handle on the carriage, and a system of shafting including a splined shaft extending along the bed and horizontal and vertical shafts respectively connected thereto in the headstock for connecting the handle with the said means, the arrangement being such that movement of the handle in one direction is adapted to release the brake and apply the power to rotate the spindle and movement thereof in the opposite direction is adapted to interrupt the power and apply the brake to stop the rotation of the spindle.

9. In a machine of the class described, the combination of a bed, a carriage movable thereon, a headstock, a driving shaft rotatably mounted in the headstock, power control means remote from the shaft, a mechanical brake cooperating with the shaft, a device extending along the shaft laterally thereof and cooperating with the power control means and brake, an operating sector engaging said device, an operating handle mounted on the carriage, and means including a system of shafting connecting the handle with the sector whereby movement of the handle is adapted to control both the power control means and the brake.

10. In a machine of the class described, the combination of a bed, a carriage movable thereon, a headstock, a spindle rotatably mounted in the headstock, a power control means and a mechanical brake for controlling the operation of the spindle, a device acting on the power control means and the brake to control both, a plurality of shafts connected by bevel gears and including a splined shaft extending parallel to the path of movement of the carriage, a bevel gear mounted on the carriage and slidably keyed to the said splined shaft, and a handle on the carriage for operating the bevel gear, the said shafts operatively connecting the device with the handle whereby the operation of the spindle may be controlled by the handle on the carriage.

In testimony whereof, I hereto affix my signature.

HAROLD L. BLOOD.